May 10, 1927.
R. HILL
1,627,973
FURROWING MACHINE
Filed June 5, 1924
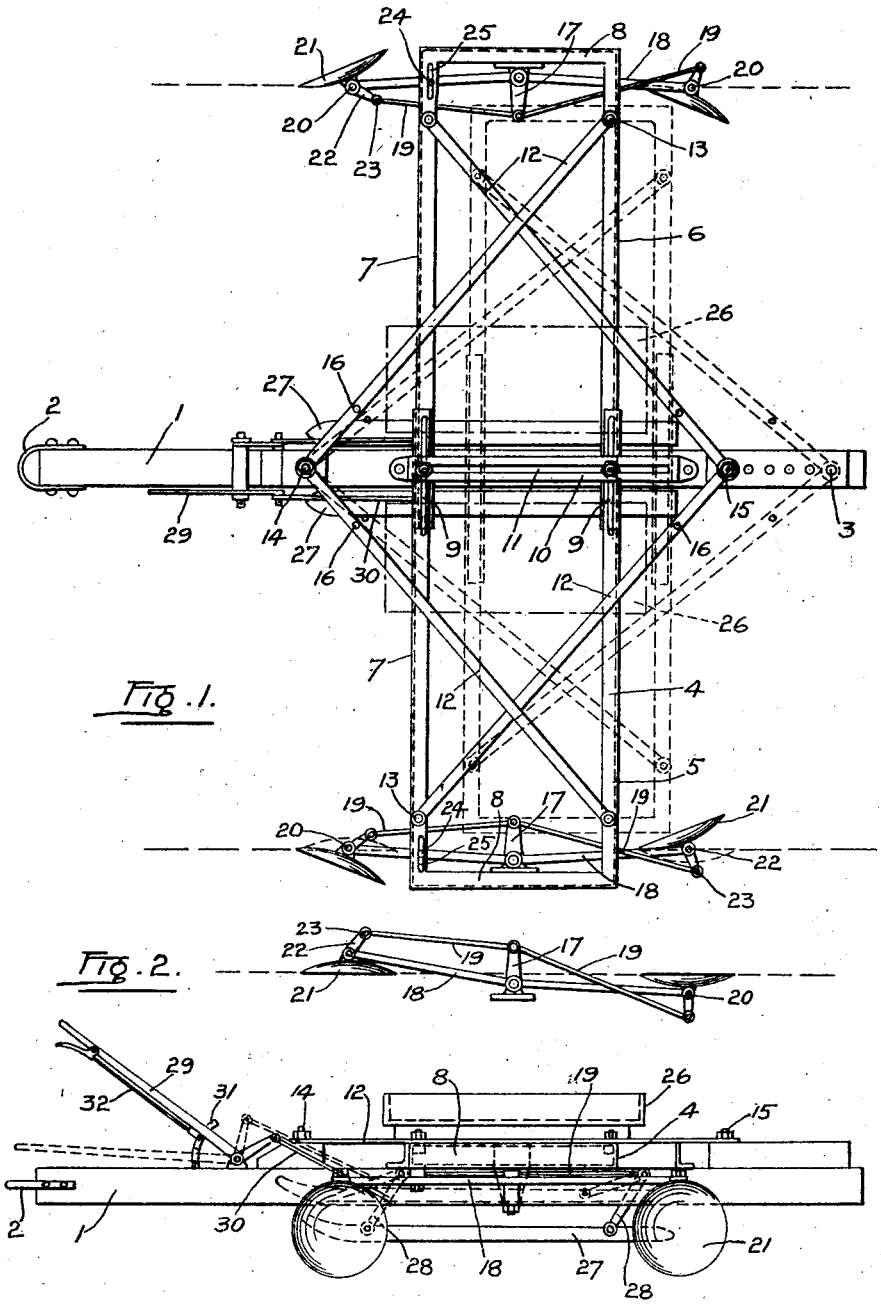
INVENTOR
REGINALD HILL
BY Fetherstonhaugh & Co
ATTORNEYS Patented May 10, 1927.

1,627,973

UNITED STATES PATENT OFFICE.

REGINALD HILL, OF KELOWNA, BRITISH COLUMBIA, CANADA.

FURROWING MACHINE.

Application filed June 5, 1924. Serial No. 718,131.

My invention relates to improvements in furrowing machines the objects of which are to provide means whereby a pair of furrows of any desired width or spacing may be formed, and whereby the adjustment of one disc on a furrower automatically sets the other disc to a like amount in the opposite direction to widen or reduce the with of the furrow; other objects are to provide a simple means for centering the draft pole between the furrowing devices when adjusting the machine to vary the spacing to provide means for limiting the depth of the furrows and also to enable the furrowing discs to be so aligned that no cutting effect is produced thereby and the machine conveniently drawn from place to place.

The invention consists essentially of a frame adjustable in width which carries a pair of furrow cutting devices at its opposite ends, as will be more fully described in the following specification in which—

Fig. 1 is a plan of my invention.

Fig. 2 is a plan of the left side furrower with the discs aligned for wheeling without cutting.

Fig. 3 is a side elevation showing the depth regulating device in engagement with the ground surface.

In the drawings like characters of reference indicate corresponding parts in each figure.

The numeral 1 indicates generally a draft pole which is provided with a shackle or other connection 2 at its forward end whereby the machine is drawn. The rear end of the pole 1 is provided with a plurality of bolt holes 3 spaced apart, the purpose of which will appear later.

The numeral 4 indicates generally a frame formed in two halves 5 and 6 each having transverse members 7 and end members 8, the members 7 of the halves 5 and 6 overlap each other at their inner ends and are slotted as at 9, the overlapping portion being passed over the pole 1 and under a plate 10, secured to the plate and having a longitudinal slot 11, bolts are provided which pass through the slots 9 of the transverse members 7 and the slot 11 of the plate 10 for the purpose of securing the halves 5 and 6 of the frame 4 together after adjusting its width. A parallel adjustment to the frame 4 is provided by rods 12 connected in pairs adjacent the outer end of the frame as at 13 and the pairs being connected together in the form of lazy tongs one of the intermediate joints of which is pivoted to the pole as at 14 and the corresponding joint being pivoted at any of the holes 3 by a bolt 15.

Should it be desired to reduce the width of the frame to its minimum the inner ends of the rods 12 are crossed over the pole 1 and are connected thereto through the apertures 16 in the manner before described. Laterally disposed brackets 17 are secured to the end members 8 of the frame 4 to which are pivotally mounted a disc arm 18 and a disc set rod 19. A shaft 20 is journalled vertically at each end of the arms 18, and mounted at the lower end of the shaft is a rotatable disc 21 which is similar to the disc used in disc plows; at the upper end of the shaft a crank 22 is secured to the outer end 23, the cranks being pivotally connected to the outer extremities of the disc set rods 19. A locking bolt 24 projects upwards from each of the disc arms 18 through slotted apertures 25 in the frame members so as to permit the disc arms to be rocked in either direction to increase or decrease the width of the cut and to permit of the discs being simultaneously set to a greater or lesser angle and after such adjustment to lock the disc bar and its co-operating parts against movement.

The numeral 26 indicates a pair of boxes shown in dotted lines in Fig. 1, and in solid lines in Fig. 3, which are carried by the frame 4 in which weights may be carried for the purpose of increasing the depth of cut of the discs 21. As a means for preventing the discs from cutting too deep in soft ground I connect to the draft pole 1, a pair of skids 27 by means of crank rods 28 which are actuated by a bell crank lever 29 and connecting rods 30, the lever 29 being preferably mounted to lie substantially parallel to the pole when the skids are raised so that under normal ground conditions where the skids are not needed to contact with the ground, the lever will not catch in the overhanging branches of the trees between which the furrowing may be done.

The numeral 31 indicates a quadrant to which the lever 29 is releasably held in position by a trigger rod 32.

Having thus described the several parts of my invention I will now explain its use.

In Fig. 2 the discs 21 are set in alignment to enable the machine to be drawn without furrows being cut; on releasing the fastening on the locking bolts 24 and drawing the forward ends of the disc arms 18 towards the draught pole 1 the discs of each pair are separated about a line drawn parallel to the longitudinal axis of the machine and the discs are simultaneously set at opposite angles to that line so that the width of the furrow cut is increased according to the degree of movement of the disc arms. When both pairs of discs have been set the fastening to the bolt 24 is tightened leaving the machine ready for use.

If the ground is soft and the tendency of the machine is to cut deeper than is desired, the lever 29 is raised to lower the skids 27 into contact with the ground as required.

What I claim as my invention is:

1. A furrow forming machine comprising discs arranged in pairs, each pair being disposed to cut a single furrow, each disc being formed and mounted to present a forward cutting edge and a rear turning edge to the soil to be furrowed and means for maintaining the forward cutting edges of the discs of a pair upon a medial line irrespective of the setting of the discs or the width of the furrow.

2. A furrow forming machine comprising a frame presenting parallel end members, a laterally projecting bracket carried by each of said end members, disc arms pivoted to said brackets, discs equipped with vertical carrying shafts journalled in the outer extremities of said disc arms, cranks at the upper ends of said shafts, and disc set rods pivoted to said cranks and to said brackets.

Dated at Kelowana this 19th day of May, 1924.

REGINALD HILL.